United States Patent
Bui et al.

(10) Patent No.: US 10,410,670 B1
(45) Date of Patent: *Sep. 10, 2019

(54) TAPE DRIVE TEMPERATURE CONTROL FOR MEDIA DIMENSIONAL STABILITY

(71) Applicant: International Business Machines Corporation, Armonk, NY (US)

(72) Inventors: Nhan X. Bui, Tucson, AZ (US); Kevin B. Judd, Vail, AZ (US); Randy C. Inch, Tuscon, AZ (US); Mark A. Lantz, Thalwil (CH); David H. F. Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,660

(22) Filed: Feb. 27, 2019

Related U.S. Application Data

(63) Continuation of application No. 15/905,873, filed on Feb. 27, 2018.

(51) Int. Cl.
  *G11B 15/60* (2006.01)
  *G11B 5/008* (2006.01)

(52) U.S. Cl.
  CPC .......... *G11B 15/60* (2013.01); *G11B 5/00813* (2013.01)

(58) Field of Classification Search
  CPC ..... G11B 15/60; G11B 5/00813; G11B 33/14; G11B 15/665
  See application file for complete search history.

(56) References Cited

U.S. PATENT DOCUMENTS

| | | | |
|---|---|---|---|
| 3,625,456 A | 12/1971 | Hankins |
| 5,014,141 A | 5/1991 | Gervais et al. |
| 5,224,643 A | 7/1993 | Kojima et al. |
| 5,327,315 A | 7/1994 | Nouchi et al. |
| 5,341,262 A | 8/1994 | Yamasaki et al. |
| 5,923,496 A | 7/1999 | Perona |

(Continued)

FOREIGN PATENT DOCUMENTS

| | | |
|---|---|---|
| EP | 1429339 A2 | 6/2004 |
| WO | 9711462 A1 | 3/1997 |

OTHER PUBLICATIONS

Bui et al., "Tape Drive Bearing Temperature Control", U.S. Appl. No. 15/905,865, filed Feb. 27, 2018, 25 pages.

(Continued)

*Primary Examiner* — Brian E Miller
(74) *Attorney, Agent, or Firm* — Brian M. Restauro; Christopher M. Pignato

(57) ABSTRACT

A determination is made whether read/write is enabled within the tape drive storage unit. In response to determining that read/write is enabled, a determination is made whether an absolute value of a channel offset exceeds a threshold value. In response to determining that the absolute value of the channel offset exceeds a threshold value, a direction of travel of the tape media is determined. In response to determining that the direction of travel of the tape media is a forward direction, a determination is made whether the channel offset is positive. In response to determining that the channel offset is positive, a left cooling device within the tape drive storage unit is powered on. The left cooling device lowers the temperature of a left guide roller and the tape media coming off a left tape storage reel prior to the media passing by a read/write head.

20 Claims, 4 Drawing Sheets

(56) References Cited

U.S. PATENT DOCUMENTS

| | | |
|---|---|---|
| 5,953,174 A | 9/1999 | Satou et al. |
| 6,005,735 A | 12/1999 | Gleim et al. |
| 6,172,834 B1 | 1/2001 | Newton |
| 7,467,757 B2 | 12/2008 | Biskeborn et al. |
| 7,551,385 B2 | 6/2009 | Biskeborn et al. |
| 7,656,602 B2 | 2/2010 | Iben et al. |
| 7,869,154 B2 | 1/2011 | Kudo et al. |
| 8,537,491 B2 | 9/2013 | Kotaki |
| 2003/0116667 A1 | 6/2003 | Tamura et al. |
| 2009/0266511 A1 | 10/2009 | Yang |

OTHER PUBLICATIONS

Bui et al. "Tape Drive Temperature Control for Media Dimensional Stability", U.S. Appl. No. 15/905,873, filed Feb. 27, 2018, 27 pages.

TAPE DRIVE TEMPERATURE CONTROL FOR MEDIA DIMENSIONAL STABILITY

BACKGROUND

The present invention relates generally to the field of magnetic tape data storage, and more particularly to controlling the temperature within a tape drive to maintain the dimensional stability of the media within the tape drive.

Magnetic tape data storage (e.g., an automated tape library) is a system for storing digital information on a magnetic tape media using digital recording. Modern magnetic tape is most commonly packaged in cartridges and cassettes; however, open reels are also used to hold the tape media. The tape drive is the device that performs writing or reading of data on the magnetic tape. Autoloaders automate cartridge handling and provide increased speed for accessing data stored on the tape media.

SUMMARY OF THE INVENTION

Embodiments of the present invention includes a system and method for controlling the temperature within a tape drive storage unit to maintain the dimensional stability of the media within the tape drive. In one embodiment, the system is comprised of the following: a left tape storage reel located on a left side of the apparatus; a right tape storage reel located on a right side of the apparatus; a tape attached to the left tape storage reel on an end of the tape and the tape also attached to the right tape storage reel on an opposing end of the tape, wherein the tape is magnetic; a tape transport mechanism, wherein the tape transport mechanism moves the tape along a tape path between the left tape storage reel and the right tape storage reel; a read/write head located between the left tape storage reel and the right tape storage reel; a left cooling device attached to and in intimate contact with a first portion of the tape transport mechanism; a right cooling device attached to and in intimate contact with a second portion of the tape transport mechanism; a left heating device attached to and in intimate contact with a third portion of the tape transport mechanism; a right heating device attached to and in intimate contact with a fourth portion of the tape transport mechanism; and a controller.

Additional embodiments of the present invention include a system and method for controlling the temperature within a tape drive storage unit to maintain the dimensional stability of the media within the tape drive. In one embodiment, a determination is made whether read/write is enabled within the tape drive storage unit. In response to determining that read/write is enabled, a determination is made whether an absolute value of a channel offset exceeds a threshold value. In response to determining that the absolute value of the channel offset exceeds a threshold value, a direction of travel of the tape media is determined. In response to determining that the direction of travel of the tape media is a forward direction, a determination is made whether the channel offset is positive. In response to determining that the channel offset is positive, a left cooling device within the tape drive storage unit is powered on. The left cooling device lowers the temperature of a left guide roller and the tape media coming off a left tape storage reel prior to the media passing by a read/write head.

DETAILED DESCRIPTION

Figure 1:
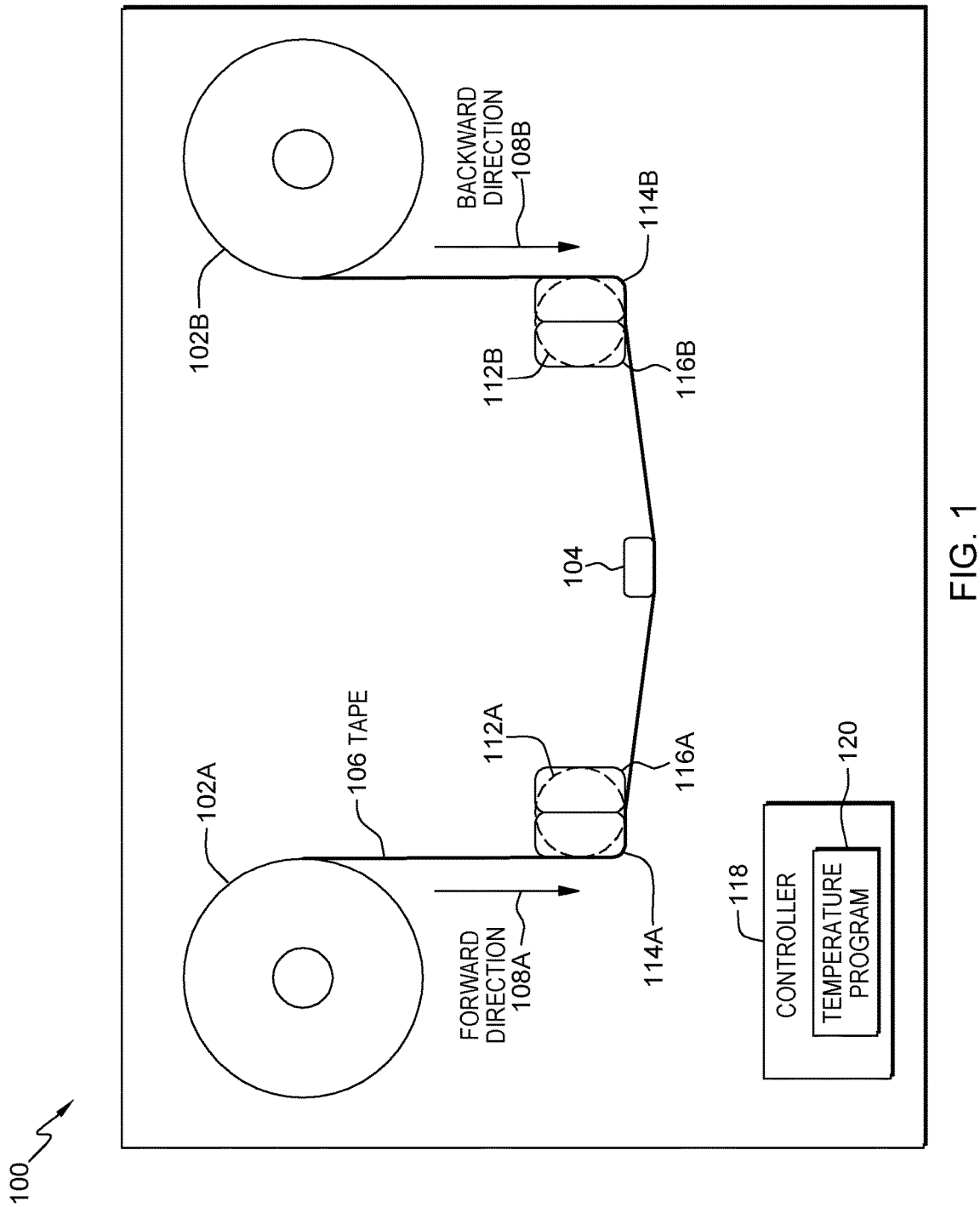
FIG. 1 depicts a schematic of an example tape storage unit with heater/cooler pairs on each guide roller, in accordance with an embodiment of the present invention.

Embodiments of the present invention provide for controlling the temperature within a tape drive to maintain the dimensional stability of the media within the tape drive. Temperature fluctuations within the tape drive can result in tape dimensional stability (TDS) issues. If the temperature is too hot within the tape drive, the media (i.e., tape) can increase in size due to thermal expansion. If the temperature is too cold within the tape drive, the media can decrease in size due to thermal contraction. In either instance, read/write errors can occur.

Embodiments of the present invention disclose an approach for controlling the temperature within a tape drive to maintain the dimensional stability of the media within the tape drive. In an embodiment, thermoelectric devices (such as Peltier devices) are placed inside the tape drive and are used to heat or cool the tape media and guide rollers, which helps to control the expansion or contraction of the media to maintain TDS.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "right", "left", "vertical", "horizontal", "top", "bottom", and derivatives thereof shall relate to the disclosed structures and methods, as oriented in the drawing Figures. The terms "overlaying", "atop", "positioned on", or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

As referred to herein, certain components in this specification are substantially similar with the exception of a "right side" versus "left side" position and arrangement within the tape drive (e.g., in FIG. 1, left tape storage reel 102A and right tape storage reel 102B). In those situations where components are substantially similar, only one of the substantially similar components will be described in detail (e.g., only left tape storage reel 102A will be described in detail).

The present invention will now be described in detail with reference to the Figures.

FIG. 1 is a schematic of an example tape storage unit with right and left guide rollers, generally designated 100, in accordance with one embodiment of the present invention. FIG. 1 provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, tape storage unit 100 includes left tape storage reel 102A, right tape storage reel 102B, read/write head 104, tape 106, left guide roller 112A, right guide roller 112B, left cooler 114A, right cooler 114B, left heater 116A, right heater 116B, controller 118, and temperature program 120.

In an embodiment, left tape storage reel 102A is an open reel made of a plastic, or a similar material, used to either collect or dispense the tape media as the tape media travels across read/write head 104 within tape storage unit 100. In an embodiment, left tape storage reel 102A is ninety-seven plus or minus one millimeter in diameter. In another embodiment, left tape storage reel 102A can be any diameter. According to embodiments of the present invention, left tape storage reel 102A may be contained within a cartridge or a cassette instead of being an open reel. In an embodiment, right tape storage reel 102B is substantially similar to left tape storage reel 102A.

In an embodiment, read/write head 104 is a type of transducer in tape storage unit 100 used to convert electrical signals to magnetic fluctuations and vice versa for writing and reading, respectively, data to and/or from tape 106. In an embodiment, read/write head 104 includes a toroidal core with a small air gap. In the embodiment, a coil of wire is wound around the toroidal core which is made of a magnetically permeable metal. Passing an electrical signal through the coil of wire results in a changing magnetic field which flows through tape 106 when passing adjacent to read/write head 104. In this manner, read/write head 104 is able to change the electrical polarity of the bits on tape 106 resulting in data records being stored to tape 106 as a series of zeroes and ones for digital data. Reversing the process induces an electrical current across the small air gap allowing read/write head 104 to read (i.e., retrieve) data from tape 106. In other embodiments, data may be read using a shielded magnetoresistive sensor such as an anisotropic magnetoresistive (AMR) sensor, a giant magnetoresistive (GMR) sensor, and a tunneling magnetoresistive (TMR) sensor.

In an embodiment, tape 106 is the media within tape storage unit 100 that data is written to or read from via read/write head 104. In an embodiment, tape 106 includes a plastic film base material (e.g., polyethylene naphthalate) with a thin, magnetizable coating on the surface (e.g., metal particulate, barium ferrite). In the embodiment, tape 106 includes four data bands, varying numbers of wraps per band, and varying numbers of tracks (read/write elements) per wrap. The number of wraps/band and tracks/wrap determine the total number of tracks on tape 106 available for data storage.

In an embodiment, forward direction 108A is a direction of travel for tape 106 when tape 106 is coming off of left tape storage reel 102A and being wound onto right tape storage reel 102B. In the embodiment, when tape 106 is traveling in forward direction 108A, tape 106 moves across read/write head 104 from the left to the right.

In an embodiment, backward direction 108B is the opposite direction of travel of tape 106 from forward direction 108A.

In an embodiment, left guide roller 112A is a sub-assembly component of the tape transport mechanism within tape storage unit 100 that guides tape 106 as tape 106 moves between left tape storage reel 102A and read/write head 104. According to an embodiment of the present invention, left guide roller 112A is a sub-assembly that consists of a main cylinder constrained to a stationary shaft by two roller bearing sub-assemblies which allow free rotation of the main cylinder around the stationary shaft. In an embodiment, left guide roller 112A changes the direction of travel of tape 106 by ninety plus or minus two degrees. According to an embodiment of the present invention, left guide roller 112A is made from stainless steel. According to another embodiment, left guide roller 112A is made from a non-stainless steel with a coating. In an embodiment, right guide roller 112B is substantially similar to left guide roller 112A with the exception that right guide roller 112B guides tape 106 as tape 106 moves between right tape storage reel 102B and read/write head 104.

In an embodiment, left cooler 114A is a thermoelectric cooling device (e.g., a Peltier cooler) used to lower the temperature of left guide roller 112A and tape 106 within tape storage unit 100. In an embodiment, left cooler 114A is attached to and in intimate contact with (i.e., covers) fifty plus or minus two percent of left guide roller 112A. In another embodiment, left cooler 114A is attached to and in intimate contact with any percentage of left guide roller 112A. According to embodiments of the present invention, left cooler 114A uses the Peltier effect to create a heat flux between the junction of two different types of materials. Left cooler 114A is a solid-state active heat pump which transfers heat from one side of a device to the other, with consumption of electrical energy, depending on the direction of the current. The advantages of Peltier cooling are a lack of moving parts or circulating liquid, very long life, invulnerability to leaks, small size, and flexible shape. The disadvantages of Peltier cooling are high cost and poor power efficiency. In an embodiment, right cooler 114B is substantially similar to left cooler 114A with the exception that right cooler 114B is attached to and in intimate contact with fifty plus or minus two percent of right guide roller 112B.

In an embodiment, left heater 116A is a thermoelectric heating device (e.g., a Peltier heater) used to increase (i.e., raise) the temperature of left guide roller 112A and tape 106 within tape storage unit 100. In an embodiment, left heater 116A is attached to and in intimate contact with (i.e., covers) fifty plus or minus two percent of left guide roller 112A. In another embodiment, left heater 116A is attached to and in intimate contact with any percentage of left guide roller 112A. According to embodiments of the present invention, left heater 116A uses the Peltier effect to create a heat flux between the junction of two different types of materials. In an embodiment, left heater 116A is a solid-state active heat pump which transfers heat from one side of a device to the other, with consumption of electrical energy, depending on the direction of the current. The advantages of Peltier heating are a lack of moving parts or circulating liquid, very long life, invulnerability to leaks, small size, and flexible shape. The disadvantages of Peltier heating are high cost and poor power efficiency. In an embodiment, right heater 116B is substantially similar to left heater 116A with the exception that right heater 116B is attached to and in intimate contact with fifty plus or minus two percent of right guide roller 112B.

In an embodiment, thermoelectric devices left cooler 114A and left heater 116A are in opposite orientation compared to one another so that left cooler 114A lowers the temperature of left guide roller 112A and tape 106 while left heater 116A increases the temperature of left guide roller 112A and tape 106. In the embodiment, thermoelectric devices right cooler 114B and right heater 116B are in opposite orientation compared to one another so that right cooler 114B lowers the temperature of right guide roller 112B and tape 106 while right heater 116B increases the temperature of right guide roller 112B and tape 106. In another embodiment, left cooler 114A, left heater 116A, right cooler 114B, and right heater 116B are located in any orientation and/or position with respect to one another such that the respective guide rollers and tape media can be heated and/or cooled to maintain tape dimensional stability. According to an embodiment of the present invention, left cooler 114A and left heater 116A cover an entire side of left guide roller 112A. Also according to the embodiment, right cooler 114B and right heater 116B cover an entire side of right guide roller 112B.

In an embodiment, controller 118 is a logic card that provides control function to tape storage unit 100. In an embodiment, controller 118 includes temperature program 120. According to embodiments of the present invention, functions managed by controller 118 include centralized management of tape storage unit 100 and sending read/write instructions to read/write head 104 for retrieving data from and storing data to tape 106.

In an embodiment, temperature program 120 is a program, a subprogram of a larger program, an application, a plurality of applications, or mobile application software, which functions to control the temperature of left guide roller 112A, right guide roller 112B, and tape 106 to maintain tape dimensional stability (TDS) of tape 106 within tape storage unit 100 to prevent read/write errors to tape 106. A program is a sequence of instructions written by a programmer to perform a specific task. According to embodiments of the present invention, responsive to an absolute value of the channel offset exceeding a threshold, temperature program 120 will power on left cooler 114A, left heater 116A, right cooler 114B, or right heater 116B, depending on (i) the direction of travel of tape 106 and (ii) whether or not the channel offset is positive. Temperature program 120 may run by itself but may be dependent on system software (not shown in FIG. 1) to execute. In one embodiment, temperature program 120 functions as a stand-alone program residing on controller 118. In another embodiment, temperature program 120 may work in conjunction with other programs, applications, etc., found in tape storage unit 100. In yet another embodiment, temperature program 120 may be found on other computing devices (not shown in FIG. 1) in tape storage unit 100.

Figure 2:
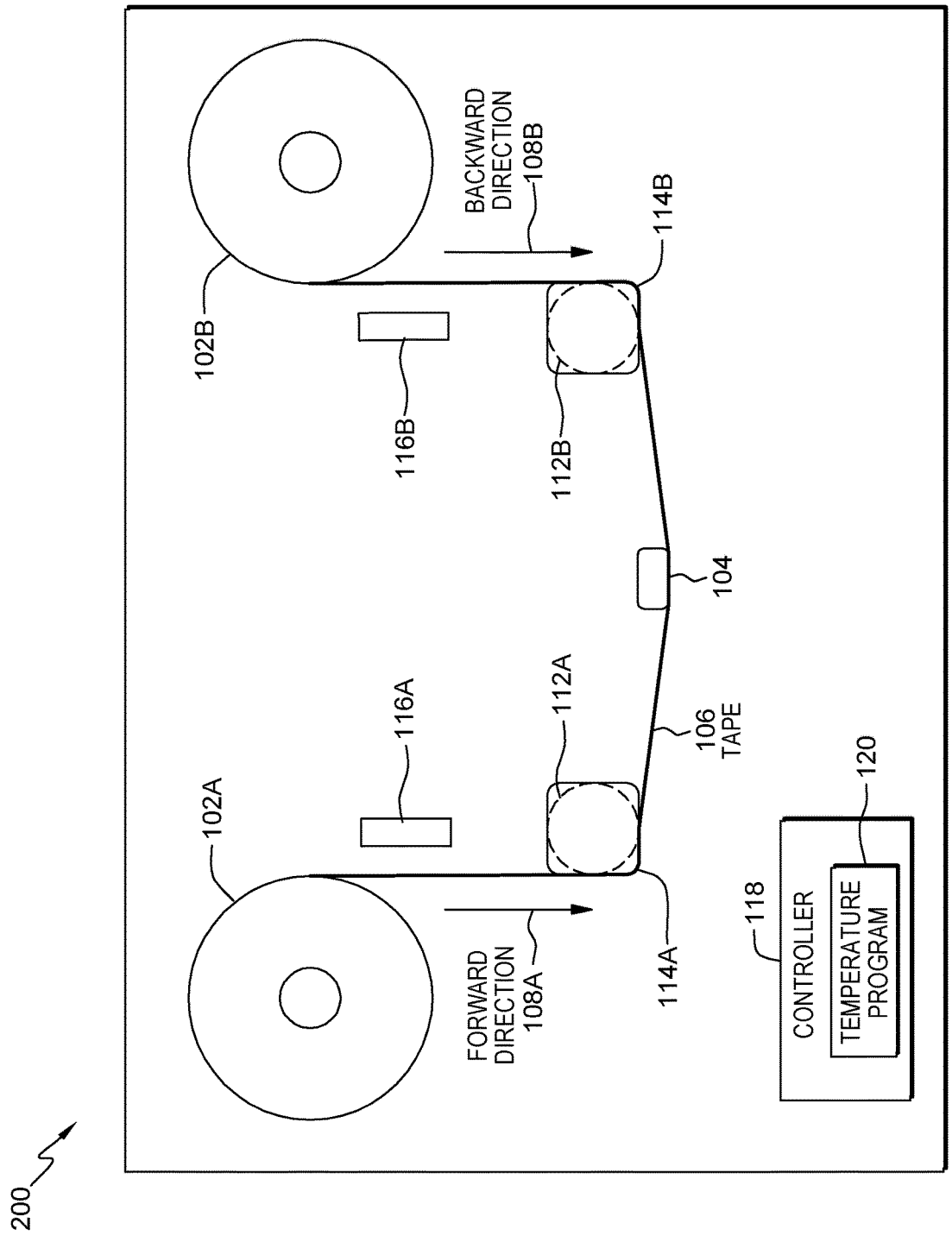
FIG. 2 depicts a schematic of an example tape storage unit with independent heaters and coolers, in accordance with an embodiment of the present invention.

FIG. 2 is a schematic of an example tape storage unit with thermoelectric devices used for cooling and conventional heating devices used for heating, generally designated 200, in accordance with one embodiment of the present invention. FIG. 2 provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, tape storage unit 200 includes the following previously discussed features: left tape storage reel 102A, right tape storage reel 102B, read/write head 104, tape 106, left guide roller 112A, right guide roller 112B, left cooler 114A, right cooler 114B, left heater 116A, right heater 116B, controller 118, and temperature program 120. In the embodiment however, left heater 116A and right heater 116B are not thermoelectric devices, but instead are conventional heating devices. The new features will be discussed in detail in the following paragraphs.

According to embodiments of the present invention, left heater 116A is a heater used to directly heat tape 106. In various embodiments, left heater 116A is a heating element, a conventional bulb, an infrared bulb, a resistor, a resistance material, a resistance wire, and the like. In an embodiment, left heater 116A is positioned near left tape storage reel 102A directly adjacent to tape 106 to provide efficient heating of tape 106 as it moves toward read/write head 104. In an embodiment, right heater 116B is substantially similar to left heater 116A with the exception of being positioned near right tape storage reel 102B directly adjacent to tape 106.

According to embodiments of the present invention, left cooler 114A is attached to and in intimate contact with the flat side of left guide roller 112A and right cooler 114B is attached to and in intimate contact with the flat side of right guide roller 112B.

Figure 3:
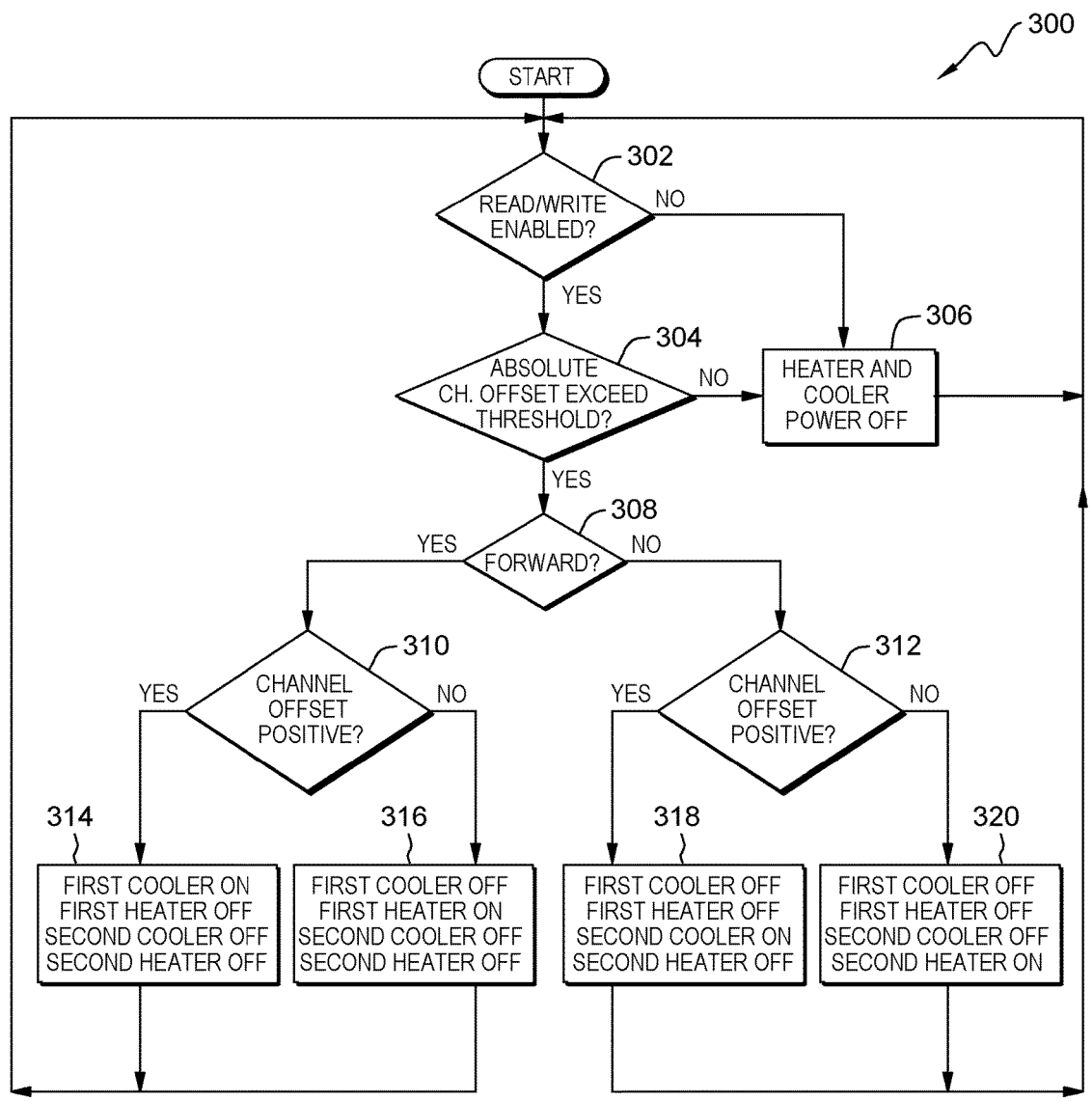
FIG. 3 depicts a flowchart of a program for controlling the temperature within a tape drive to maintain the dimensional stability of the media within the tape drive, in accordance with an embodiment of the present invention.

FIG. 3 is a flowchart of workflow 300 depicting an approach for controlling the temperature within a tape drive to maintain the dimensional stability of the media within the tape drive. In one embodiment, the method of workflow 300 is performed by temperature program 120. In an alternative embodiment, the method of workflow 300 may be performed by any other program working with temperature program 120. In an embodiment, a user may invoke workflow 300 upon powering on tape storage unit 100 or tape storage unit 200. In an alternative embodiment, a user may invoke workflow 300 upon accessing temperature program 120.

In an embodiment, temperature program 120 determines whether read/write is enabled (decision step 302). In other words, temperature program 120 determines whether a tape drive storage unit is writing data to a tape media or reading data from a tape media. In an embodiment (decision step 302, YES branch), temperature program 120 determines that read/write is enabled on the tape drive storage unit; therefore, temperature program 120 proceeds to decision step 304 to determine whether the absolute value of the channel offset exceeds a threshold value. In the embodiment (decision step 302, NO branch), temperature program 120 determines that read/write is not enabled on the tape drive storage unit; therefore, temperature program 120 proceeds to step 306 to power off any heaters or coolers that are running.

In an embodiment, temperature program 120 determines whether an absolute value of a channel offset exceeds a threshold (decision step 304). In other words, responsive to determining that read/write is enabled in the tape drive storage unit, temperature program 120 determines whether the absolute value of the channel offset within tape drive 200 exceeds a threshold value. According to embodiments of the present invention, a servo system (not shown) is used to determine the channel offset. In an embodiment, the channel offset is the difference in two spans, where the first span is the distance between the read/write head servo reader elements and second span is the distance between the servo patterns on the tape media. When the first span minus the second span is positive, the tape is too narrow and needs to be expanded. When the first span minus the second span is not positive (i.e., negative), the tape is too wide and second span needs to be reduced. For example, a negative channel offset (i.e., "0−2=−2") indicates that the tape is too wide and needs to be cooled to shrink the tape while a positive channel offset (i.e., "0−(−2)=2") indicates that the tape is too narrow and needs to be warmed to expand the tape. In an embodiment (decision step 304, NO branch), temperature program 120 determines that the absolute value of the channel offset does not exceed a threshold value; therefore, temperature program 120 proceeds to step 306 to turn off all heater/cooler power. In the embodiment (decision step 304, YES branch), temperature program 120 determines that the absolute value of the channel offset does exceed a threshold value; therefore, temperature program 120 proceeds to decision step 308 to determine whether the tape media in the tape drive storage unit is traveling in the forward direction.

In an embodiment, temperature program 120 turns heater/cooler power off (step 306). In other words, responsive to (i) determining that read/write is not enabled in the tape drive storage unit and/or (ii) that the absolute value of the channel offset does not exceed a threshold value, temperature program 120 powers off any cooler that is powered on as cooling is not required within the tape drive storage unit.

In an embodiment, temperature program 120 determines whether the direction of movement is forward (decision step 308). In other words, responsive to determining that read/write is enabled in the tape drive storage unit and the absolute value of the channel offset exceeds a threshold value, temperature program 120 determines whether the tape media is traveling in the forward direction. In an embodiment (decision step 308, YES branch), temperature program 120 determines that the tape media is traveling in the forward direction; therefore, temperature program 120 proceeds to step 310 to determine if the channel offset is positive. In the embodiment (decision step 308, NO branch), temperature program 120 determines that the tape media is not traveling in the forward direction (i.e., the tape media is traveling in the backward direction); therefore, temperature program 120 proceeds to step 312 to determine if the channel offset is positive.

According to an embodiment of the present invention, temperature program 120 determines whether the channel offset is positive (decision step 310). In other words, responsive to determining that the tape media is moving in the forward direction, temperature program 120 determines whether the value of the channel offset within tape drive 200 is positive. In an embodiment (decision step 310, YES branch), temperature program 120 determines that the channel offset is positive; therefore, temperature program 120 proceeds to step 314 to turn on left cooler 114A. In the embodiment (decision step 310, NO branch), temperature program 120 determines that the channel offset is not positive; therefore, temperature program 120 proceeds to step 316 to turn on left heater 116A.

According to an embodiment of the present invention, temperature program 120 determines whether the channel offset is positive (decision step 312). In other words, responsive to determining that the tape media is not moving in the forward direction, temperature program 120 determines whether the value of the channel offset within tape drive 200 is positive. In an embodiment (decision step 312, YES branch), temperature program 120 determines that the channel offset is positive; therefore, temperature program 120 proceeds to step 318 to turn on right cooler 114B. In the embodiment (decision step 312, NO branch), temperature program 120 determines that the channel offset is not positive; therefore, temperature program 120 proceeds to step 320 to turn on right heater 116B.

In an embodiment, temperature program 120 turns on power to the left cooler (step 314). In other words, responsive to determining that read/write is enabled in the tape drive storage unit, the absolute value of the channel offset exceeds a threshold value, the tape media is traveling in the forward direction, and the value of the channel offset is positive, temperature program 120 powers on left cooler. In a first example, referring to FIG. 1, tape 106 is traveling in forward direction 108A (i.e., tape 106 is coming off of left tape storage reel 102A, passing under read/write head 104, and is being wound onto right tape storage reel 102B). In the first example, left cooler 114A is powered on by temperature program 120 in order to cool left guide roller 112A, the associated guide roller bearings, and tape 106. In a second example, referring to FIG. 2, tape 106 is traveling in forward direction 108A (i.e., tape 106 is coming off of left tape storage reel 102A, passing under read/write head 104, and is being wound onto right tape storage reel 102B). In the second example, left cooler 114A is powered on by temperature program 120 in order to cool left guide roller 112A, the associated guide roller bearings, and tape 106.

In an embodiment, temperature program 120 turns on power to the left heater (step 316). In other words, responsive to determining that read/write is enabled in the tape drive storage unit, the absolute value of the channel offset exceeds a threshold value, the tape media is traveling in the forward direction, and the value of the channel offset is not positive, temperature program 120 powers on left heater. In a third example, referring to FIG. 1, tape 106 is traveling in forward direction 108A (i.e., tape 106 is coming off of left tape storage reel 102A, passing under read/write head 104, and is being wound onto right tape storage reel 102B). In the third example, left heater 116A is powered on by temperature program 120 in order to heat left guide roller 112A, the associated guide roller bearings, and tape 106. In a fourth example, referring to FIG. 2, tape 106 is traveling in forward direction 108A (i.e., tape 106 is coming off of left tape storage reel 102A, passing under read/write head 104, and is being wound onto right tape storage reel 102B). In the fourth example, left heater 116A is powered on by temperature program 120 in order to heat tape 106.

In an embodiment, temperature program 120 turns on power to the right cooler (step 318). In other words, responsive to determining that read/write is enabled in the tape drive storage unit, the absolute value of the channel offset exceeds a threshold value, the tape media is not traveling in the forward direction, and the value of the channel offset is positive, temperature program 120 powers on right cooler. In a fifth example, referring to FIG. 1, tape 106 is traveling in backward direction 108B (i.e., tape 106 is coming off of right tape storage reel 102B, passing under read/write head 104, and is being wound onto left tape storage reel 102A). In the fifth example, right cooler 114B is powered on by temperature program 120 in order to cool right guide roller 112B, the associated guide roller bearings, and tape 106. In a sixth example, referring to FIG. 2, tape 106 is traveling in backward direction 108B (i.e., tape 106 is coming off of right tape storage reel 102B, passing under read/write head 104, and is being wound onto left tape storage reel 102A). In the sixth example, right cooler 114B is powered on by temperature program 120 in order to cool right guide roller 112B, the associated guide roller bearings, and tape 106.

In an embodiment, temperature program 120 turns on power to the right heater (step 320). In other words, responsive to determining that read/write is enabled in the tape drive storage unit, the absolute value of the channel offset exceeds a threshold value, the tape media is not traveling in the forward direction, and the value of the channel offset is not positive, temperature program 120 powers on right heater. In a seventh example, referring to FIG. 1, tape 106 is traveling in backward direction 108B (i.e., tape 106 is coming off of right tape storage reel 102B, passing under read/write head 104, and is being wound onto left tape storage reel 102A). In the seventh example, right heater 116B is powered on by temperature program 120 in order to heat right guide roller 112B, the associated guide roller bearings, and tape 106. In an eighth example, referring to FIG. 2, tape 106 is traveling in backward direction 108B (i.e., tape 106 is coming off of right tape storage reel 102B, passing under read/write head 104, and is being wound onto left tape storage reel 102A). In the eighth example, right heater 116B is powered on by temperature program 120 in order to heat tape 106.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having described embodiments of an approach for controlling the temperature of a tape drive to improve the track-following performance of the media within the tape drive (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

Figure 4:
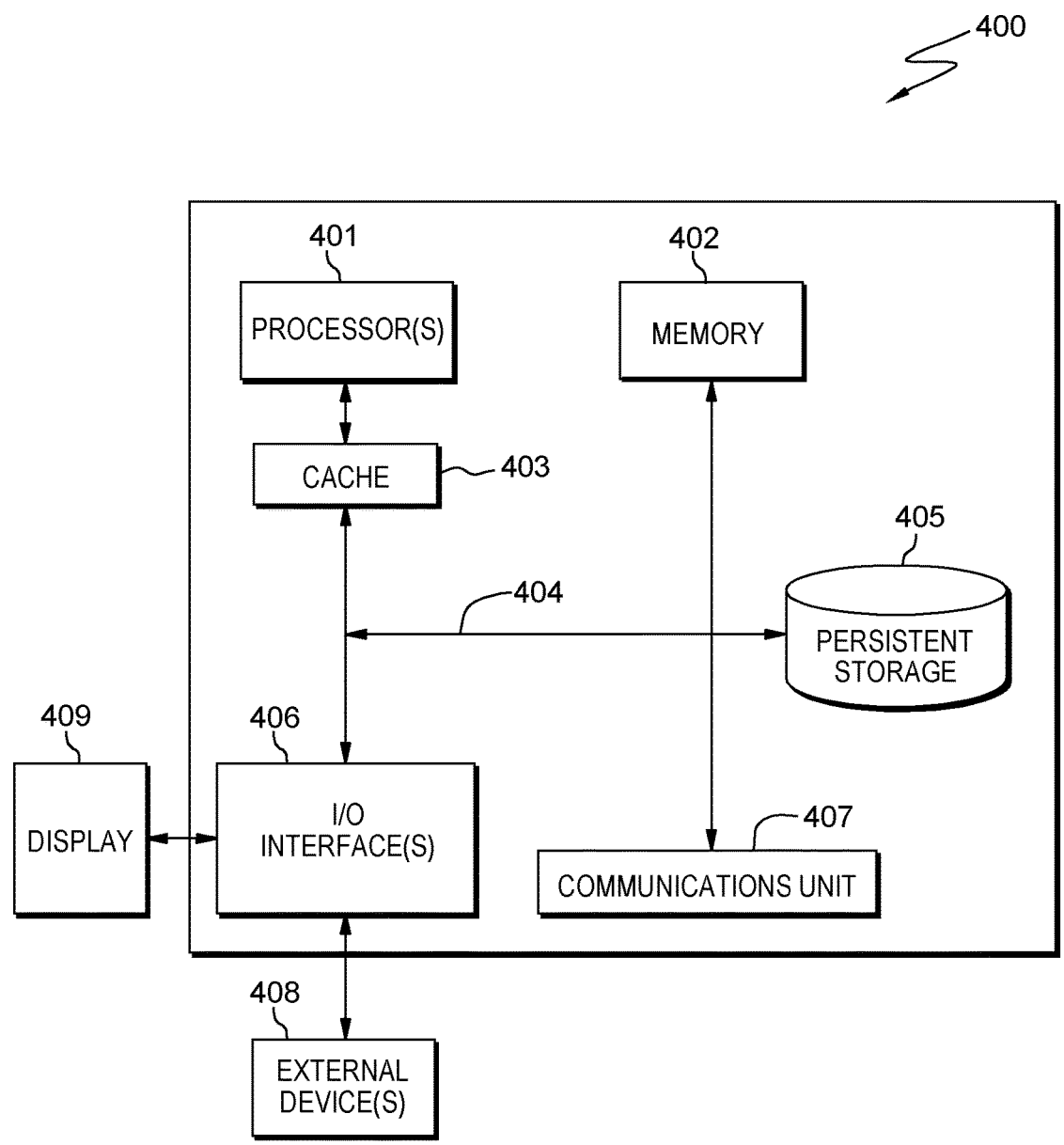
FIG. 4 depicts a block diagram of components of a computing environment, in accordance with an embodiment of the present invention.

FIG. 4 depicts computer system 400, which is an example of a system that includes temperature program 120. Computer system 400 includes processor(s) 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touchscreen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer system comprising:
  one or more computer processors;
  a tape drive storage unit connected to the one or more computer processors, the tape drive storage unit comprising a tape media, first cooling device; a first guide roller, a first tape storage reel and a read/write head within the tape drive storage unit;
  a computer-readable storage media coupled to the one or more computer processors, wherein the computer readable storage media contains program instructions executing a computer-implemented method comprising the steps of:
    determining whether read/write is enabled within the tape drive storage unit;
    determining whether an absolute value of a channel offset exceeds a threshold value;
    determining a direction of travel of the tape media;
    determining that the direction of travel of the tape media within the tape drive storage unit is a forward direction and whether the channel offset is positive;
    responsive to determining that the channel offset is positive, powering on the first cooling device of the tape drive storage unit;
    lowering a temperature of the first guide roller and tape media coming off the first tape storage reel prior to the tape media passing by the read/write head.

2. The computer system of claim 1, further comprising:
  a first heating device within the tape drive storage unit, and responsive to determining that the channel offset is not positive, the first heating device increases the temperature of the first guide roller and the tape media coming off the first tape storage reel prior to the tape media passing by the read/write head.

3. The computer system of claim 1, wherein the tape drive storage unit further comprises
a second cooling device, a second guide roller and a second tape storage reel;
responsive to determining that the direction of travel of the tape media within the tape drive storage unit is not a forward direction, further determining, whether a channel offset is positive;
responsive to determining that the channel offset is positive, powering on the second cooling device; and
lowering a temperature of the second guide roller and the tape media coming off the second tape storage reel prior to the tape media passing by the read/write head of the tape drive storage unit.

4. The computer system of claim 3, further comprising:
a second heating device within the tape drive storage unit;
responsive to determining that the channel offset is not positive, powering on, the second heating device within the tape drive storage unit;
increasing the temperature of the second guide roller and the tape media coming off the second tape storage reel prior to the tape media passing by the read/write head within the tape drive storage unit.

5. The computer system of claim 1, wherein the channel offset is a difference between a first span and a second span, where the first span is a first distance between read/write head servo reader elements and the second span is a second distance between servo patterns on the tape media.

6. The computer system of claim 2, wherein the first cooling device and the first heating device maintain tape dimensional stability to prevent read/write errors.

7. The computer system of claim 1, further comprising:
responsive to determining that the read/write is not enabled within the tap drive storage unit or the read/write is enabled within the tape drive storage unit and the absolute value of the channel offset does not exceed the threshold value, powering off any cooling device or heating device that is powered on.

8. The computer system of claim 1, further comprising a controller, wherein the controller comprises the one or more computer processors.

9. The computer system of claim 8, wherein the controller sends read/write instructions to the read/write head.

10. The computer system of claim 2, wherein the first cooling device and the first heating device are Perltier thermoelectric devices.

11. A computer system comprising:
a controller comprising one or more processors;
a first tape storage reel connected to the controller
a second tape storage reel connected to the controller;
a read/write head, located between the first tape storage reel and the second tape storage reel;
a tape attached to the first tape storage reel on an end of the tape and the tape attached to the second tape storage reel on an opposing end of the tape;
a tape transport mechanism configured to move the tape along a tape path between the first tape storage reel and the second tape storage reel;
a first cooling device attached to and placed in intimate contact with a first portion of the tape transport mechanism; and a computer-readable storage media coupled to the controller, wherein the computer readable storage media contains program instructions executing a computer-implemented method comprising the steps of:
determining whether read/write is enabled;
determining whether an absolute value of a channel offset exceeds a threshold value;
determining a direction of travel of the tape;
determining that the direction of travel of the tape is a forward direction and whether the channel offset is positive;
responsive to determining that the channel offset is positive, powering on the first cooling device and lowering a temperature of the tape transport mechanism and tape coming off the first tape storage reel prior to the tape passing by the read/write head.

12. The computer system of claim 11 further comprising:
a first heating device attached to and in intimate contact with a second portion of the tape transport mechanism; and
responsive to determining that the channel offset is not positive, powering on the first heating device and increasing the temperature of the tape transport mechanism and the tape coming off the first tape storage reel prior to the tape passing by a read/write head.

13. The computer system of claim 11, further comprising:
a second cooling device attached to and in intimate contact with a third portion of the tape transport mechanism;
responsive to determining that the direction of travel of the tape media within the tape drive storage unit is not a forward direction, further determining, whether a channel offset is positive;
responsive to determining that the channel offset is positive, powering on the second cooling device and lowering a temperature of the tape transport mechanism and the tape coming off the second tape storage reel prior to the tape media passing by the read/write head.

14. The computer system of claim 13, further comprising:
a second heating device attached to and in intimate contact with a fourth portion of the tape transport mechanism;
responsive to determining that the channel offset is not positive, powering on, the second heating device and increasing the temperature of the tape transport mechanism and the tape coming off the second tape storage reel prior to the tape passing by the read/write head.

15. The computer system of claim 11, wherein the channel offset is a difference between a first span and a second span, where the first span is a first distance between read/write head servo reader elements and the second span is a second distance between servo patterns on the tape media.

16. The computer system of claim 12, wherein the first cooling device and the first heating device maintain tape dimensional stability to prevent read/write errors.

17. The computer system of claim 11, wherein the controller sends read/write instructions to the read/write head.

18. The computer system of claim 12, wherein the tape transport mechanism comprises a first guide roller and a second guide roller;
the first guide roller and the second guide roller each include a main cylinder constrained to a stationary shaft by two roller bearing sub-assemblies which allow free rotation of the main cylinder around the stationary shaft;
the first guide roller is positioned in the tape path between the first tape storage reel and the read/write head; and the second guide roller is positioned in the tape path between the second tape storage reel and the read/write head.

19. The computer system of claim 18, wherein:
the first cooling device is attached to and in intimate contact with a first portion of a side of the main cylinder of the first guide roller; and
the first heating device is attached to and in intimate contact with a second portion of the side of the main cylinder of the first guide roller, wherein the first portion and the second portion cover an entire side of the main cylinder of the first guide roller.

20. The computer system of claim 12, where the first cooling device and the first heating device are Perltier thermoelectric devices.

* * * * *